United States Patent
Courtright

[11] 3,826,275
[45] July 30, 1974

[54] HOSE REEL CONSTRUCTION
[75] Inventor: Burr Courtright, La Grande, Oreg.
[73] Assignee: CH₂O, Inc., La Grande, Oreg.
[22] Filed: Sept. 18, 1972
[21] Appl. No.: 290,099

[52] U.S. Cl. .......................................... 137/355.2
[51] Int. Cl. ............................................. B65h 75/36
[58] Field of Search....... 137/355.12, 355.16, 355.2, 137/355.26, 355.27, 355.28

[56] References Cited
UNITED STATES PATENTS

| | | | |
|---|---|---|---|
| 495,720 | 4/1893 | Birdsall | 137/355.19 |
| 2,490,353 | 12/1949 | Hannay | 137/355.27 |
| 2,514,862 | 7/1950 | Hannay | 137/355.2 |
| 2,595,655 | 5/1952 | Hannay | 137/355.2 X |
| 2,631,063 | 3/1953 | Jensen | 137/355.2 |
| 2,735,717 | 2/1956 | Harman | 137/355.12 |
| 3,175,574 | 3/1965 | Morford | 137/355.26 |
| 3,352,461 | 11/1967 | Dascanio | 137/344 X |
| 3,476,139 | 11/1969 | Guthrie | 137/355.16 |

Primary Examiner—Henry T. Klinksiek

[57] ABSTRACT

A hose reel device constructed for winding and unwinding fluid carrying hoses such as agricultural, irrigation water supply hoses. The subject reel, in a preferred form of the invention, is constructed for attaching to the conventional three-point hitch connections of a conventional farm tractor. The reel includes hub structure suitable for receiving a journal shaft to which a main gear is affixed. Orbital motor means drives the main gear in either of two directions, for winding and unwinding functions. In a modification of the equipment a water-fluid exhaust unit such as a blower or water pump is attached to the frame and has the useful purpose of exhausting water from a hose lying on the terrain preparatory to the hose being wound upon the reel. A clutch and gear combination, structurally related to the revolving reel proper, is constructed so that the reel may be not only driven in either of two directions and also conditioned for free-spooling, as desired. Adjustable stand structure and towing bracket means are optional but usable features.

9 Claims, 6 Drawing Figures

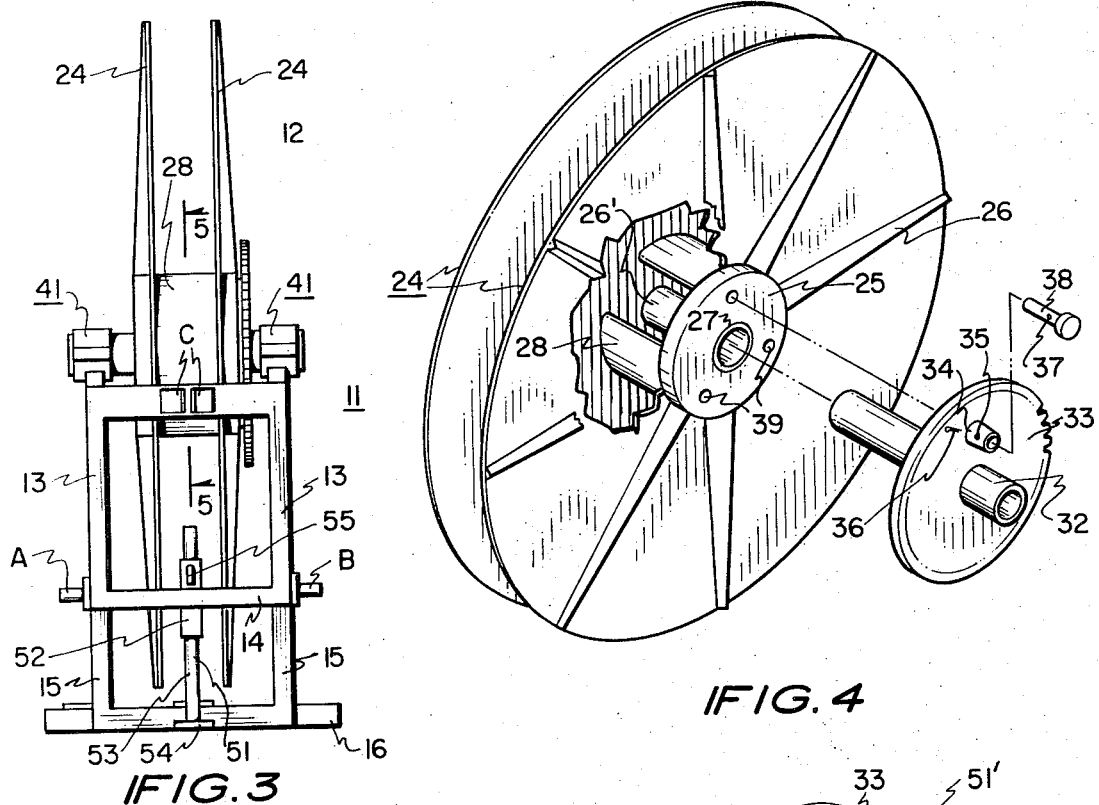
FIG.4
FIG.3
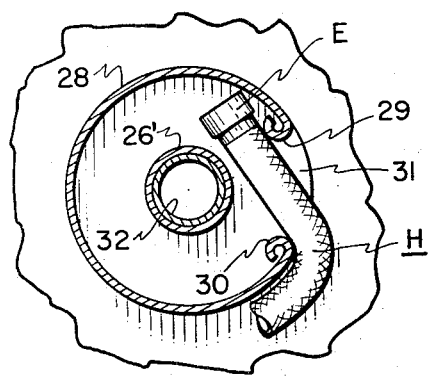
FIG.5
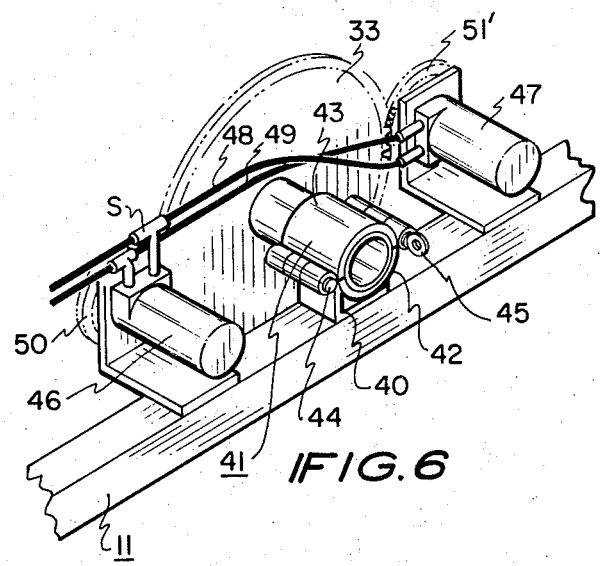
FIG.6

HOSE REEL CONSTRUCTION

SPECIFICATION

The present invention relates to hose reels and, more particularly, to power-driven hose reels that are suitable for farm use as, for example, for storage and transport of heavy-duty agricultural irrigation hoses.

The present invention has several distinct advantages over known prior art. A first is that the reel is journaled in a vertical, erect position, and this in a manner such that the hose may be wound and unwound with respect to the reel with a minimum of applied force and hose distortion. Additionally, the reel is journaled to structure that is supplied with three-point hitch connections accommodating the conventional three-point hitch construction of a standard farm tractor. In this way the hitch of the tractor may easily be attached to the reel construction such that the latter can be lifted for transport and carriage. In this way, the reel device need not employ wheels in its own right, although such is permissible.

In a preferred form of the invention the reel structure is provided with a stationary spool or internal winding hub which is suitably apertured to receive a hose end, this preparatory to the winding of the hose upon the fixed spool of the reel. The reel itself is journaled for revolvement upon a shaft that can be fixed and also released, by virtue of a clutch mechanism, so that the reel can be free-spooling when desired. Orbital fluid-operated, reversible motor means are coupled to a main gear fixed to the aforesaid shaft and are constructed for revolving the shaft in either of two chosen opposite directions. Preferably the motors are hydraulically operated and include hose lines easily coupled to the auxiliary connections conventionally supplied with the operating hydraulic system of a tractor.

The journalling means for the reel are preferably hinge bearings that can be opened so that the reel is easily disengaged from its support structure. Blower or water pump means is supplied to exhaust hoses at or preparatory to their attachment and winding about the subject reel. Hose glide means are likewise supplied the support structure for the reel.

Accordingly, a principal object of the present invention is to provide a new and improved reel structure for storage and transport of fluid conduit hoses.

A further object of the invention is to provide in a reel structure for agricultural hoses a water exhaust unit that can be employed to exhaust water from a previously used hose prior to or at its winding upon the reel of the structure of the invention.

A further object is to provide, in a power driven agricultural hose reel, orbital motor means constructed and dimensioned to drive the main gear associated with revolvement of the reel.

A further object is to provide an adjustable stand for hose reel structure as well as hose guide means.

An additional object is to provide agricultural hose reel structure which is constructed for mounting to the conventional three-point hitch connections of a standard tractor.

A further object is to provide an orbital gear drive for agricultural hose reels, and this with a clutch mechanism so that the reel proper can be free-spooling when desired.

A further object is to provide a hose reel including a central spool or winding portion constructed to receive and retain a hose end preparatory to the winding of the hose upon the reel.

The features of the present invention may best be understood by reference to the following description taken in connection with the accompanying drawings in which:

FIG. 3 is an end view of the hose reel device looking in a direction from right to left relative to FIG. 2; for convenience of illustration the upstanding hose guides are deleted from the FIG. 3 illustration.

FIG. 4 is an exploded perspective, partially broken away for convenience of illustration, of the reel structure proper of the device and the gear and clutch means used to selectively drive such reel.

FIG. 5 is an enlarged section taken along the line 5—5 in FIG. 3, illustrating the central hub and spool structure of the reel.

FIG. 6 is an enlarged, fragmentary perspective of the central portion of the structure shown in FIG. 2.

Figure 1:
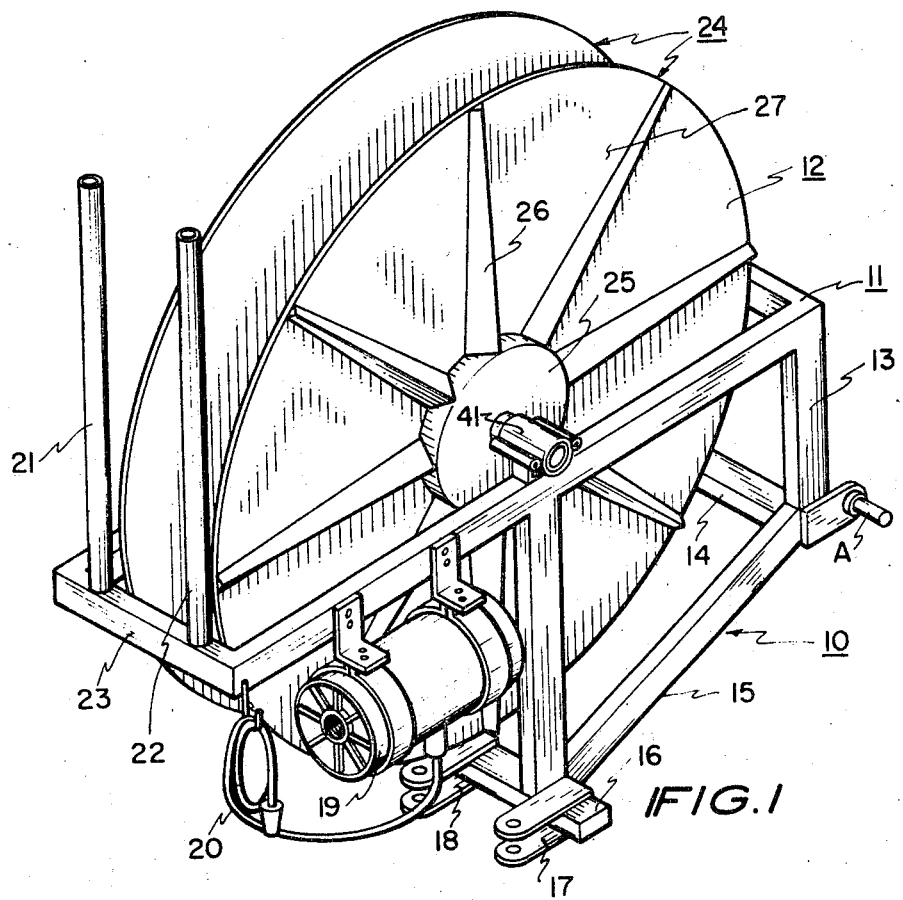
FIG. 1 is a perspective view, looking from the right rear, of a hose reel device constructed in accordance with the principals of the present invention; for convenience of illustration the preferably used water exhaust unit of the structure is shown only in this figure.

In the drawings, support frame 10 includes an upper rectangular frame member 11 which receives reel 12 as indicated. Depending from and welded to rectangular frame member 11 are a pair of forward uprights 13, one being shown, which are braced and mutually spaced apart by transverse forward brace 14. Welded or otherwise secured to the opposite junctures of respective forward uprights 13 and transverse brace 14 are respective angulated bottom braces 15 on each side of the structure. Bottom braces 15 are braced apart by a transverse bottom brace or ground support portion 16. To the latter is welded a pair of rearwardly oriented pulling brackets 17 and 18 which comprise clevis connections. The latter are designed to be useful for towing additional agricultural or irrigation equipment, as needed.

An important consideration in the inclusion of the invention is the provision of hose-water exhaust unit 19. The same may comprise a blower or pump and is constructed for connection to the end of an elongated irrigation hose such that water therein, as the hose lies along terrain, may be pumped or blown out of the hose preparatory to the winding of the same upon the subject reel.

The water exhaust member may include either a hydraulic fluid motor drive means or electrical drive means; in either case the same has a power cord or conduit 19 suitable for connection to the power source, electrical or hydraulic, of a tractor, by way of example.

The pair of mutually spaced, upstanding hose guide members 21 and 22 are welded or otherwise secured to the rearward cross-member portion 23 of rectangular frame 11.

The reel 12 itself includes a pair of vertically oriented and generally circular side plate or web members 24 each of which includes a hub 25, stiffener ribs 26 extending outwardly from the latter, and a side web 27.

Each of the side members may be stamped and formed as by conventional manufacturing techniques as one piece member, or independent members may be used as in the case of stiffener ribs 26 and respective hubs 25 such that each of the side members comprises a composite welded part.

Inter-connecting side members 24 at respective hubs 25 is a journalling cylinder 26', see FIG. 4, the same being inserted in and welded to the respective hubs 25 at respective apertures 27 thereof.

In addition, welded and disposed between respective hubs 25 is a hose-wrap spool 28 comprising an arcuate length of metal or other suitable metal rolled at its edges 29 and 30, see FIG. 5, to form hose end receiving slot 31. Journal shaft 32, see FIG. 4, is made integral with or is pinned to main gear 33. The latter includes a boss 34 having keeper hole 35 which accommodates a keeper or clevis pin 36 and its insertion through hole 37 of clutch pin 38. Clutch pin 38 is dimensioned to selectively engage a respective clutch pin aperture 39 of that wheel hub 25 seen in FIG. 4.

Rectangular frame 11, see FIGS. 1 and 6, includes mounted thereon, at opposite sides thereof, a respective journal bracket 40 accommodating respective hinge-type bearings 41. The same includes respective hinge halves 42 and 43 which are joined together by hinge pin 44 and are releasably secured on the opposite side by withdrawable bearing keeper 45, see FIG. 6. As seen in FIG. 3, bearings 41 are disposed on opposite sides of the reel and are mounted to opposite sides of the rectangular frame 11 as seen in FIG. 3.

Orbital, reversible fluid motors 46 and 47 are coupled together by hydraulic lines 48 and 49 and their associated connections S for cooperative and preferably synchronous drive, and each includes an output drive spur gear 50 and 51' meshing with main or bull gear 33, see FIGS. 4 and 6. Fluid motors are designed to operate together and in like revolvement so as to jointly rotate the main gear 33, and hence the reel as keyed thereto by clutch pin 38 when pressure is applied relative to the fluid hydraulic lines 48 and 49 in one direction. When pressure is reversed then of course the fluid motors will revolve in the opposite direction. The hydraulic connections to the hydraulic system of a prime mover is not shown. Rather, it will be understood that the hose reel is constructed for transport by conventional tractor having a self-contained hydraulic system and hydraulic connections accommodating connection to external hydraulically driven equipment. It is suggested that the fluid motors be hydraulic, used in lieu of electric motors, since the requisite hydraulic pressure necessary to provide the drive for the reel is already provided in conventional tractors.

Figure 2:
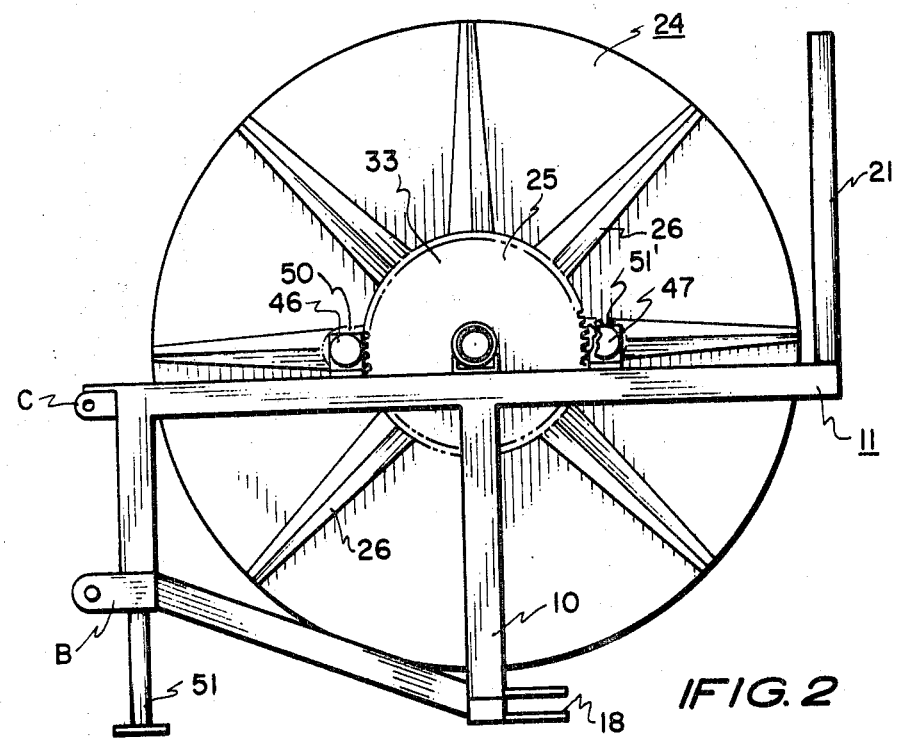
FIG. 2 is a side elevation of that side of the hose reel structure of FIG. 1 which is opposite to the viewer in FIG. 1.

Support frame 10 also includes, welded thereto, three point tractor hitch structure as at pins A and B, mounted at side points, and clevis C, see FIGS. 1 and 2.

While it will be understood that wheels, not shown, may be coupled to the frame as at transverse bottom brace 16, yet the same need not be the case. In any event, it will be desirable to incorporate a stand 51 which is adjustably received in sleeve 52. The stand 51 includes upstanding shaft 53 and support plate 54, see FIG. 3. A vertical adjustment device 55 in the nature of a set screw, pin, or other means may be provided to adjust the stand in its desired height.

In operation the user will connect the hose reel of the present invention to the tractor at the three-point hitch, mutually triangularly spaced coupling structures, A, B and C, see FIGS. 1 and 3. The empty wheel structure may be driven into the field, that is, carried by the tractor at its three-point hitch connection until the hose, previously used, is reached, the same is to be wrapped upon the reel. At this point, the hose is connected to the water exhaust unit 19 in FIG. 1 so as to exhaust as much water as possible from the previously used hose.

At this juncture the clutch pin 38 is disconnected from its hub such that the reel is free-spooling, whereupon slot 31 can be oriented in a direction oriented toward that end of the hose which is to be connected first to the hose reel. Hose end E of hose H, see FIG. 5, is next inserted through slot 31 in the manner indicated, whereupon the clutch pin 38 is caused to re-engage a selected hole 39 of respective hub 25. Hydraulic fluid pressure is next applied to lines 48 and 49 so as to drive the fluid motors 46 and 47 such that the hose is caused to wind upon the hose wrap spool or central portion 28 of the hose reel. Once the hose is completely wound upon the hose reel, then fluid pressure drive is stopped and the reel is transported to a new location.

Should it be desired to remove the hose from the reel at the new location, then the hose may be either free-spooled off as by disengagement of the clutch pin or and, more typically, the hydraulic drive at the tractor can be reversed so as to reverse-operate the fluid motors 46 and 47, thereby producing an actual motor-drive spooling out of the hose as the outermost end thereof. Preferably, of course, the tractor will be powered to move forwardly during reel spool-out, powered by fluid motors 46 and 47, so that no additional manual labor is required.

Once unwinding and spool-out of the hose has been effected, then it is a simple matter to disengage the hose end E from the central portion or spool 28 of the structure. Clutch pin release may again be used to effect a proper orientation of the slot 31 to make a disengagement of the hose end E from the spool in the most advantageous manner.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. An agricultural dead hose storage reel device including, in combination, a dead hose storage reel having a hose end retention slot; support frame means journalling said reel for operative rotation; and means comprising a plurality of mutually triangularly spaced coupling structures attached to said support frame means for securing said support frame means to the three-point hitch structure of an external tractor.

2. The device of claim 1 wherein said reel is provided with a shaft journaled to said support frame means and incorporates a spool fixedly disposed about and spaced around said shaft, said spool being provided with a horizontal slot aperture as said slot extending the width of said spool, and defined by inwardly rolled edges provided said spool, for receiving and retaining the positionment of an external hose end to be disposed between said shaft and said spool.

3. The device of claim 1 wherein said reel is provided with a shaft journaled to said support frame, a main gear fixed to said shaft, said device including hydraulic orbital motor means mounted to said frame structure, having an output drive gear disposed in operative meshing engagement with said main gear, and provided with means for hydraulically connecting to auxiliary hydraulic pressure means when supplied said external tractor.

4. The device of claim 3 wherein said orbital motor means is reversible.

5. The device of claim 1 wherein said reel is provided with a shaft journaled to said support frame means a main gear axially fixed to said shaft, a pair of hydraulic orbital motors disposed on said frame means and having output gear drive means engaging said main gear at mutually spaced points.

6. The device of claim 1 wherein said reel includes a hub provided with a hollow cylindrical journalling member, a shaft disposed through said journalling member and journaled to said support frame means, a main gear affixed said frame means, releasable means for releasably keying said main gear to said reel, and orbital motor means mounted to said support frame means and having spur gear means meshing with said main gear for driving said main gear.

7. The structure of claim 1 wherein said device includes means for exhausting water from a hose to be wound upon said reel preparatory to the actual winding of said hose upon said reel.

8. In combination, a fluid hose reel; support structure journalling said reel; means mounted to said support structure for powering the revolvement of said reel; and means mounted to said support structure for exhausting water from an external hose to be wound upon said reel.

9. In combination, an agricultural fluid dead hose storage reel; support structure journalling said reel; means for transporting said reel and support structure; and a pair of elongate, upright, mutually horizontally spaced hose guide means secured to and upstanding from and above said support frame and having their interspacing facing the interior of said reel.

* * * * *